United States Patent [19]

Brennen

[11] Patent Number: 5,319,535
[45] Date of Patent: Jun. 7, 1994

US005319535A

[54] ACTIVE POWER LINE CONDITIONER HAVING CAPABILITY FOR REJECTION OF COMMON-MODE DISTURBANCES

[75] Inventor: Michael B. Brennen, Pittsburgh, Pa.

[73] Assignee: Westinghouse Electric Corp., Pittsburgh, Pa.

[21] Appl. No.: 108,261

[22] Filed: Aug. 19, 1993

[51] Int. Cl.$^5$ .................... H02M 5/458; H02M 1/12
[52] U.S. Cl. ........................................ 363/40; 363/98; 323/207
[58] Field of Search ............... 363/39, 40, 97, 98, 363/131, 132; 323/207

[56] References Cited

U.S. PATENT DOCUMENTS

| | | |
|---|---|---|
| 3,825,814 | 7/1974 | Pelly . |
| 3,825,815 | 7/1974 | Gyugyi et al. ................ 321/9 A |
| 4,241,395 | 12/1980 | Stacey et al. ................ 363/39 |
| 4,651,265 | 3/1987 | Stacey et al. ................ 363/35 |

Primary Examiner—Emanuel T. Voeltz

[57] ABSTRACT

The present invention provides an APLC which has improved common-mode disturbance rejection capability when compared with similarly-sized devices constructed according to current teachings. The need for an isolation transformer is, in many cases, eliminated by the invention. The invention alters the coupling transformer of the series parallel APLC or the isolation inductor of the newly-proposed inductor-parallel APLC to create a balun effect in the high and low conductors of the electrical supply network. Particularly, first and second windings are substituted for the single winding of the transformer primary or the isolation inductor. These two windings are serially-connected on the high and low conductors, respectively, with appropriate polarity such that self-inductance values of each are additive. Low pass capacitors and surge protectors may also be added to further protect the APLC and the load.

11 Claims, 3 Drawing Sheets

ACTIVE POWER LINE CONDITIONER HAVING CAPABILITY FOR REJECTION OF COMMON-MODE DISTURBANCES

BACKGROUND OF THE INVENTION

1. Field of the Invention.

The present invention relates to active power line conditioners which are utilized to regulate the quality of electrical energy delivered from an electrical energy source to an electrical load. More particularly, the invention relates to an improvement in such devices (APLC) which significantly increases the capability of rejecting common mode disturbances which may appear in the energy supply line.

2. Description of the Prior Art.

Electric supply networks are increasingly being exposed to the consequences of nonlinear loads, such as data processing equipment, numerical controlled machines, variable speed motor drives, robotics, medical apparatus and communication equipment. Such loads draw nonlinear pulse-like currents instead of the sinusoidal currents drawn by linear loads (i.e., resistors, inductors and capacitors). Such nonlinear currents flow through the source impedance of the electrical energy source, thus causing "normal mode" distortion of the AC line voltage.

This "normal mode" voltage distortion may produce a number of undesired effects. For example, sensitive loads connected to the network may experience operational difficulties. Additionally, the RMS current supplied by the source increases due to the presence of harmonics in the nonlinear currents. These harmonics may significantly increase $I^2R$ losses in interposing transformers.

Another problem which may have significant effects on many types of electrical equipment is the occurrence of temporary sags in the supply voltage. For example, electrical equipment in use today often incorporate a power supply input stage which converts the AC line voltage to DC voltage utilizing a full wave rectifier connected across one or more large filter capacitors. In normal operation, the filter capacitor recharges with each peak of the rectified line voltage. Only during this peak is the load actually drawing current from the electrical supply network. When the rectified line voltage is lower than the voltage level across the filter capacitors, rectifier diodes will prevent current from flowing. If, however, the AC line voltage does not maintain an adequate peak-to-peak level, these filter capacitors will not be able to maintain their required peak charge levels. As a result, operation of the associated electrical equipment may be affected.

Many of these problems can be mitigated through the use of power electronic devices known as active power line conditioners. Such devices typically comprise one or two switching inverters arranged in a series, parallel, or series-parallel configuration. The inverters are controlled (generally by pulse width modulation (PWM) techniques) to effect a flow of current between a DC energy storage element and the AC supply lines to which they are connected. Such devices are shown and described in U.S. Pat. Nos. 4,651,265 and 3,825,815, which are incorporated herein by reference.

In addition to normal mode disturbances, the electric supply network may be exposed to "common mode" disturbances frequently generated by lightning and ground fault switching tansients. Common mode disturbances, which appear between the power conductors and a ground conductor of the electric supply network, can exceed normal mode voltages by orders of magnitude. In addition to often causing damage to loads connected to the network, large common mode voltages can damage the APLC itself. It is thus desirable to reduce common mode disturbances to as great an extent as possible.

In the past, the elimination of common mode voltage disturbances has often been achieved by the installation of an isolation transformer. In order, however, to maintain the commercial viability of an APLC device, the manufacturing cost should be kept as low as possible. Thus, while an isolation transformer would likely work well for the purpose of eliminating common mode disturbances in an APLC device, they impose a significant weight and cost penalty which is undesirable.

SUMMARY OF THE INVENTION

The present invention provides active power line conditioner devices which have improved common-mode disturbance rejection capability when compared with similarly-sized devices constructed according to current teachings. The need for an isolation transformer is, in many cases, eliminated by the invention. The invention achieves these results by altering the coupling transformer of the series parallel APLC or the isolation inductor of the newly-proposed inductor-parallel APLC to create a balun effect in the high and low conductors of the electrical supply network. Particularly, first and second windings are substituted for the single winding of the transformer primary or the isolation inductor. These two windings are serially-connected on the high and low conductors, respectively, with appropriate polarity such that self inductance values of each are additive. Low pass capacitors and surge protectors may also be added to give further protection of APLC circuitry and the load against undesired common mode disturbances.

DETAILED DESCRIPTION OF PRESENTLY PREFERRED EMBODIMENTS

Figure 1A:
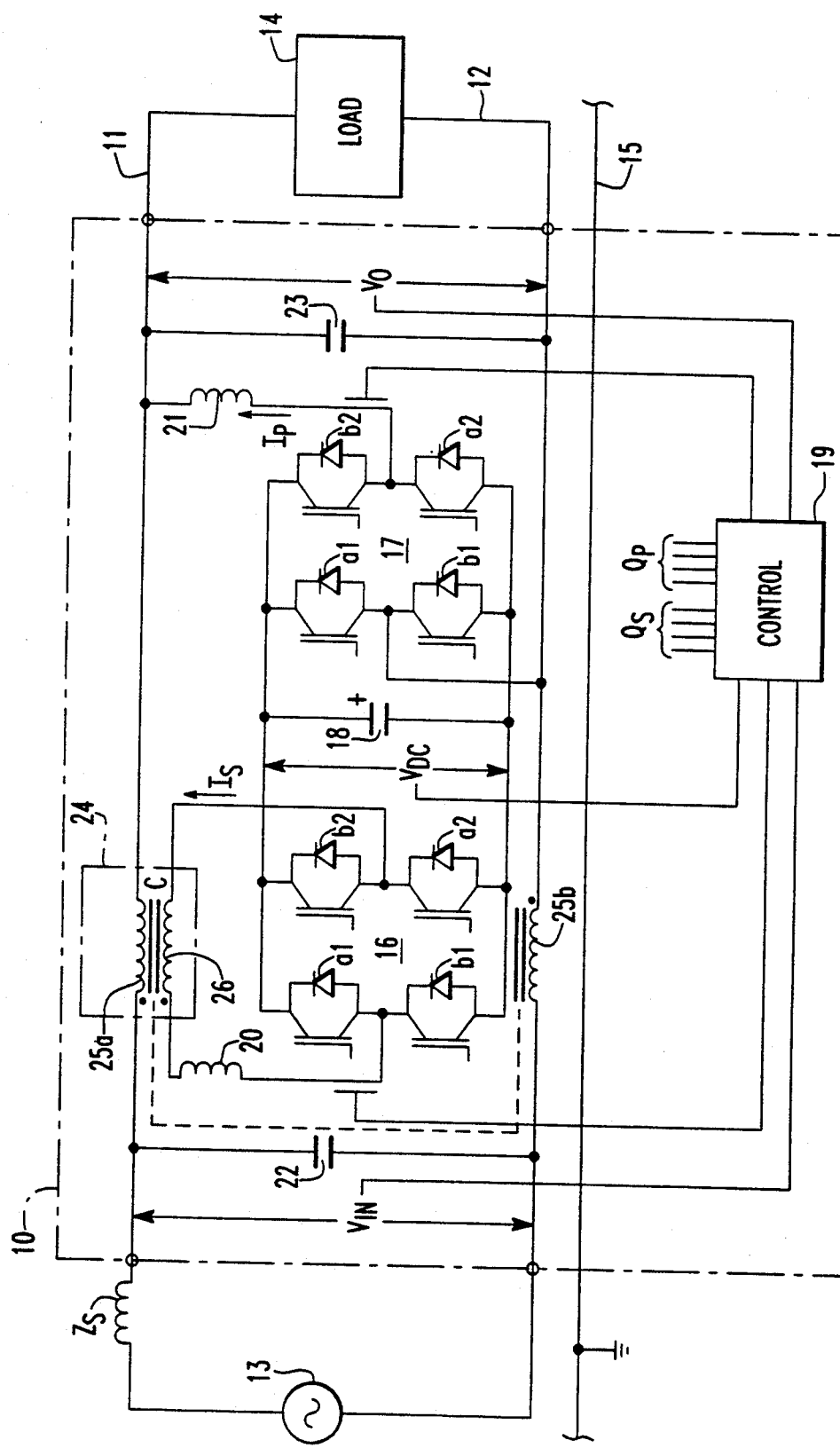
FIG. 1A is a schematic representation of an series-parallel APLC constructed in accordance with the present invention.

FIG. 1A illustrates a series-parallel APLC 10 constructed in accordance with the invention. As shown, APLC 10 is connected interposing high conductor 11 and low conductor 12 of an electrical supply network including electrical energy source 13 and electrical load 14. In this case, the electrical supply network also includes a ground conductor 15. The source impedance $Z_s$ of electrical energy source 13, which is primarily inductive in nature, is shown along high conductor 11.

APLC 10 includes a series inverter 16 and a parallel inverter 17 interconnected by a shared DC link. A storage capacitor 18 is connected across the DC terminals of inverters 16 and 17 and functions as a DC energy storage element. Instead of capacitor 18, an inductor may also be used for this purpose. It is desirable to maintain the voltage across capacitor 18 at an essentially constant value.

Inverters 16 and 17 each include two pairs of switching devices a1, a2 and b1, b2 which are operated in a complementary manner by control 19. Control 19 receives inputs from appropriate sensors within APLC 10 which may provide information regarding the following: AC input voltage $V_{in}$, AC output voltage $V_o$, DC link voltage VDC, series inverter current $I_s$ and parallel inverter current $I_p$. Based on this information, control 19 develops appropriate gating signals (respectively denominated as $Q_s$ and $Q_p$) to deliver regulated power to load 14 at fundamental frequency. Preferably, control 19 operates switches a1, a2 and b1, b2 according to PWM techniques.

Series inverter 16 (which here includes a tie inductor 20) is coupled in series with electrical energy source 13 to apply an AC regulation voltage to AC input voltage $V_{in}$ in the proper phase and magnitude such that AC output voltage $V_o$ is regulated. Parallel inverter 17 (which here includes a tie inductor 21) is generally connected across load 14 to source or sink line current as necessary to provide harmonic currents and ripple filtering. In order that parallel inverter 17 will be able to easily source or sink line current as desired, the DC voltage $V_{DC}$ across capacitor 18 should be maintained at a level slightly higher than the nominal value of the AC output voltage $V_o$. Because DC voltage $V_{DC}$ may otherwise tend to be depleted due to switching and conduction losses within APLC 10, parallel inverter 17 is also controlled to draw an appropriate amount of real power from the AC supply line. Preferably, the link control has a relatively slow response to avoid interaction between series inverter 16 and parallel inverter 17. Capacitors 22 and 23 are provided to filter switching harmonics generated by the switching action of inverters 16 and 17, respectively.

As with the prior art, series inverter 14 provides the AC regulation voltage for buck/boost regulation of the AC line voltage via a coupling transformer. In a prior art series-parallel APLC, however, the primary winding of the coupling transformer has been serially connected only in the high conductor between the source and the load. While this conventional arrangement is effective to provide regulation of normal mode voltage disturbances, it is generally ineffective against common-mode disturbances. In accordance with the invention, however, suppression of common-mode disturbances is facilitated by configuring transformer 24 to have a split primary winding having first primary winding 25a and second primary winding 25b. First primary winding 25a is serially-connected along high conductor 11, whereas second primary winding 25b is serially connected along low conductor 12. Windings 25a and 25b are both wound about magnetically permeable core C and are connected with polarities as conventionally shown by the black dots. Transformer 24 also includes a secondary winding 26 connected across AC terminals of series inverter 16.

Figure 1B:
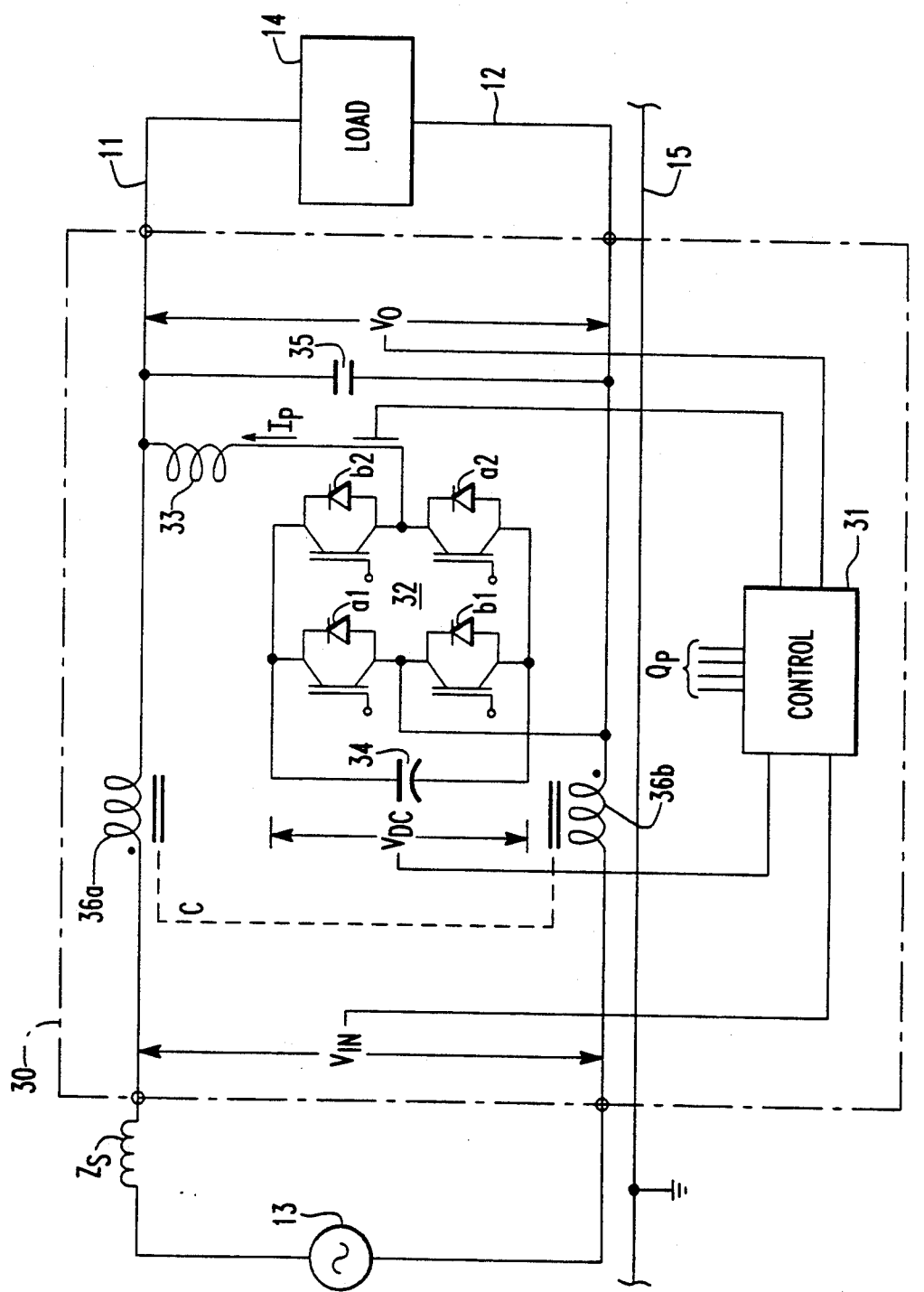
FIG. 1B is a schematic representation of an improved inductor parallel APLC constructed in accordance with the invention.

In FIG. 1B, the same electrical supply network is shown equipped with an inductor-parallel APLC 30 which is also amenable to operation according to the teachings of the present invention. APLC 30, which is fully described in U.S. patent application Ser. No. 08/030,783, filed Mar. 12, 1993 and incorporated herein by reference, utilizes a series-connected inductor in lieu of the series inverter and coupling transformer such as is present in series-parallel APLC 10. Controller 31 detects the AC input voltage supplied by source 13 and produces an optimal voltage phase shift parameter and an inverter capacitance signal. The derived optimal phase shift parameter is indicative of the instantaneous voltage phase shift across the series-connected inductor. Utilizing this information, the inverter capacitance signal may be derived. Controller 31 thereby produces gating signals $Q_p$ to control parallel inverter 32 (which here includes tie inductor 33) to act as a variable capacitor or inductor across electrical load 14 as well as to maintain the voltage across storage capacitor 34 at an essentially constant value. Filter capacitor 35 is provided to filter switching harmonics due to the switching action of inverter 32. Operation of APLC 30 produces a degree of resonance which can, within the rated regulation range, generally maintain the voltage across load 14 at the nominal value.

In the current practice as described in the above-referenced patent application Ser. No. 08/030,783, the series-connected inductor is placed only along the high conductor 11. As with series-parallel APLC 10, the invention facilitates suppression of common-mode disturbances by splitting this inductor to have a first winding 36a and a second winding 36b respectively connected along high conductor 11 and low conductor 12. Windings 36a and 36b share core C and are connected with appropriate polarity so that flux produced by each of windings 36a and 36b will be additive.

When APLC 10 and APLC 30 are configured according to the invention, the respective transformer primary and series inductor stay, in effect, in series connection. As such, regulation of normal mode line voltage is achieved as before. However, the matched leakage inductances, $L_{l1}$ and $L_{l2}$, in high conductor 11 and low conductor 12 act similarly to a balun to suppress common-mode disturbances This is evident upon viewing FIGS. 2A and 2B, which illustrate the high frequency equivalents of the circuits of FIGS. 1A and 1B, respectively.

Figure 2A:
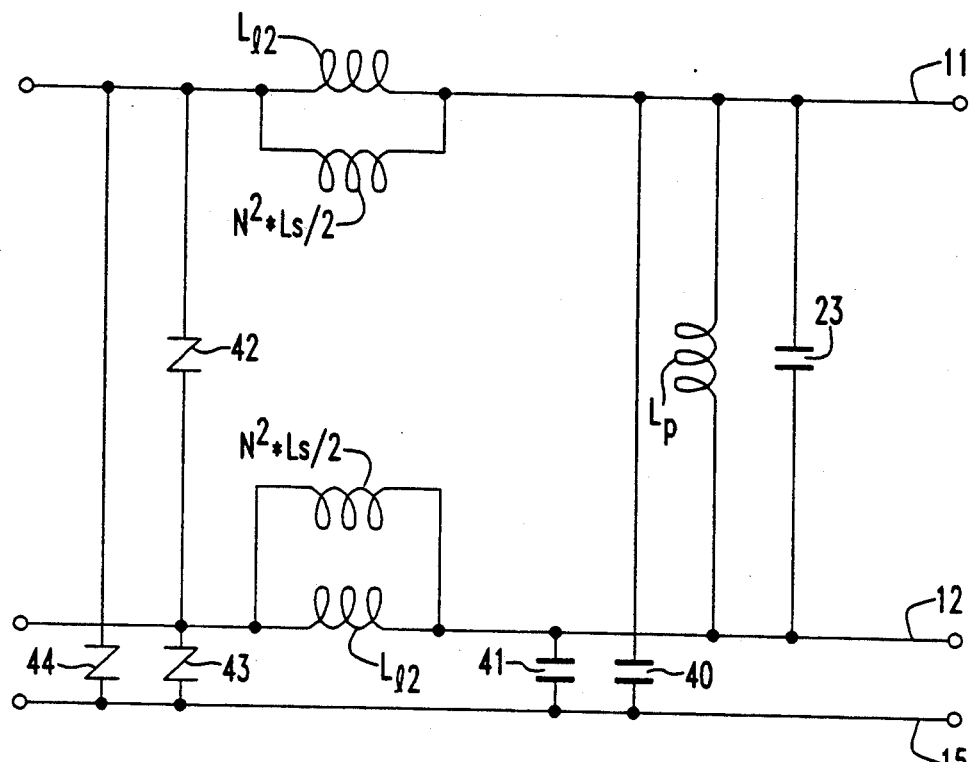
FIGS. 2A and 2B are schematic diagrams of high frequency equivalent circuits of the improved APLC devices of FIGS. 1A and 1B, respectively, including additional components for further protection against common mode disturbances.
Figure 2B:
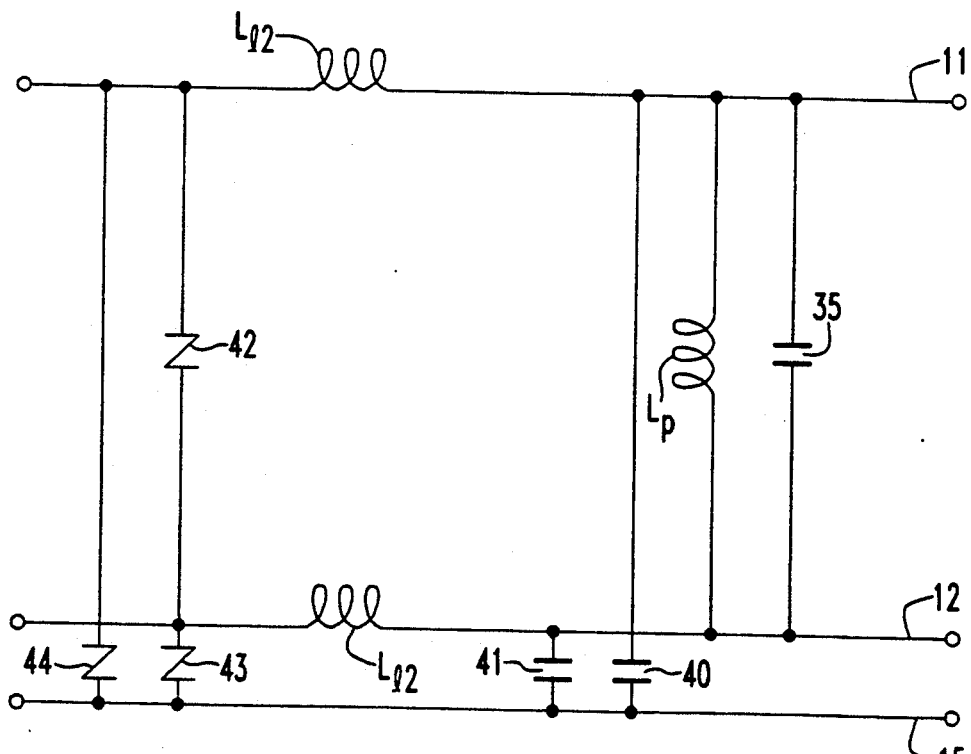

It can be seen that the parallel tie inductor (21 and 33) produces an inductance $L_p$ across conductors 11 and 12. In the case of APLC 10, secondary winding 26 of transformer 24 is loaded with the inductance, $L_s$, of tie inductor 20. As shown in FIG. 2A, this appears in the equivalent circuit as an inductance across each of the leakage inductances, $L_{l1}$ and $L_{l2}$. Each of these inductances will be seen from the primary side to have a value of $N^2*(L_s/2)$, where N is the turns ratio of transformer 24. Because this inductance prevents the flow of instantaneous current flow in the secondary circuit, the shunting effect of secondary winding 26 on the balun inductance can be essentially ignored.

To provide further suppression of common-mode voltage disturbances, filter capacitors 40 and 41 may be utilized. Filter capacitor 40 is connected as a low pass capacitor across high conductor 11 and ground conductor 15. Similarly, filter capacitor 41 is connected across low conductor 12 and ground conductor 15. Additionally, surge protectors 42, 43 and 44 may also be provided and connected as shown to give further protection against larger common-mode disturbances. Zinc oxide or similar surge protectors are believed suitable for this purpose.

It can thus be seen that the invention provides an APLC having improved common-mode disturbance suppression capability when compared with devices constructed according to current teachings. While presently preferred embodiments of the invention have been shown and described, it is to be distinctly understood that the invention is not limited thereto, but may be variously embodied and practiced within the scope of the following claims.

I claim:

1. An improved active power line conditioner of the type for electrical connection in an electrical supply network along high and low conductors thereof supplying electrical energy from an electrical energy source to an electrical load, said active power line conditioner including at least one inverter selectively controlled to condition electrical energy delivered from said source to said load, said active power line conditioner further including an inductive winding on a magnetically permeable core, said inductive winding serially connectable in said high conductor, wherein the improvement comprises:

in lieu of said inductive winding, placing a first winding and a second winding on said magnetically permeable core, said first winding serially connectable along the high conductor and said second winding serially connectable along the low conductor with appropriate polarity such that self inductance values of said first winding and said second winding are additive, whereby said first winding and said second winding will function as a balun to suppress common-mode voltage disturbances appearing on said high and low conductors.

2. The improved active power line conditioner of claim 1 wherein said electrical supply network includes a ground conductor and wherein the improvement further comprises:

a first low pass capacitor electrically connected across the high conductor and the ground conductor; and a second low pass capacitor electrically connected across the low conductor and the ground conductor.

3. The improved active power line conditioner of claim 2 wherein the improvement further comprises:

a first surge protector electrically connected across the high conductor and the low conductor;

a second surge protector electrically connected across the high conductor and the ground conductor; and a third surge protector electrically connected across the low conductor and the ground conductor.

4. The improved active power line conditioner of claim 1 wherein said inductive winding is a primary winding of a coupling transformer of a series-parallel active power line conditioner.

5. The improved active power line conditioner wherein said inductive winding is an isolation inductor of an inductor-parallel active power line conditioner.

6. An active power line conditioner for electrical connection in an electrical supply network along high and low conductors thereof to selectively condition electrical energy supplied from an electrical energy source to an electrical load, said active power line conditioner comprising:

a coupling transformer having a split primary winding and a secondary winding about a magnetically permeable core;

said split primary winding having a first winding serially connectable in the high conductor and a second winding serially connectable in the low conductor;

a series inverter electrically connected to said secondary winding;

a parallel inverter electrically connectable across the high conductor and the low conductor;

a DC energy storage element electrically connected between said series inverter and said parallel inverter; and control means for controlling said series inverter and said parallel inverter to effect the selected conditioning of electrical energy delivered from the electrical energy source to the electrical load.

7. The improved active power line conditioner of claim 6 wherein said electrical supply network includes a ground conductor and wherein the improvement further comprises:

a first low pass capacitor electrically connected across the high conductor and the ground conductor; and a second low pass capacitor electrically connected across the low conductor and the ground conductor.

8. The improved active power line conditioner of claim 7 wherein the improvement further comprises:

a first surge protector electrically connected across the high conductor and the low conductor;

a second surge protector electrically connected across the high conductor and the ground conductor; and a third surge protector electrically connected across the low conductor and the ground conductor.

9. An active power line conditioner for electrical connection in an electrical supply network along high and low conductors thereof to selectively condition electrical energy supplied from an electrical energy source to an electrical load, said active power line conditioner comprising:

a first inductive winding serially connectable in the high conductor;

a second inductive winding generally having a matched inductance to said first inductive winding, said second inductive winding serially connectable in the low conductor;

a parallel inverter electrically connectable across the high conductor and the low conductor, said parallel inverter including a DC energy storage element;

control means for controlling said parallel inverter to effect the selected conditioning of electrical energy delivered from the electrical energy source to the electrical load.

10. The improved active power line conditioner of claim 9 wherein said electrical supply network includes a ground conductor and wherein the improvement further comprises:

a first low pass capacitor electrically connected across the high conductor and the ground conductor; and a second low pass capacitor electrically connected across the low conductor and the ground conductor.

11. The improved active power line conditioner of claim 10 wherein the improvement further comprises:

a first surge protector electrically connected across the high conductor and the low conductor;

a second surge protector electrically connected across the high conductor and the ground conductor; and a third surge protector electrically connected across the low conductor and the ground conductor.

* * * * *